United States Patent
Lui et al.

(10) Patent No.: US 6,457,318 B1
(45) Date of Patent: Oct. 1, 2002

(54) RECIRCULATING REGENERATIVE AIR CYCLE

(75) Inventors: Clarence Lui, Diamond Bar; Wai-Pak Wong; Myron Quan, both of Cerritos, all of CA (US)

(73) Assignee: Honeywell International Inc., Morristown, NJ (US)

( * ) Notice: Subject to any disclaimer, the term of this patent is extended or adjusted under 35 U.S.C. 154(b) by 1 days.

(21) Appl. No.: 09/708,274

(22) Filed: Nov. 7, 2000

(51) Int. Cl.$^7$ .................................................. F25B 9/00
(52) U.S. Cl. ............................................ 62/87; 62/402
(58) Field of Search .............................. 62/402, 87, 335

(56) References Cited

U.S. PATENT DOCUMENTS

| | | |
|---|---|---|
| 4,021,215 A | 5/1977 | Rosenbush et al. |
| 4,263,786 A | 4/1981 | Eng |
| 4,535,606 A * | 8/1985 | Rannenberg ................. 62/402 |
| 5,461,882 A | 10/1995 | Zywiak |
| 5,490,645 A * | 2/1996 | Woodhouse ............. 244/118.5 |
| 5,704,218 A | 1/1998 | Christians et al. |
| 5,906,111 A * | 5/1999 | Lui ............................. 62/402 |
| 6,305,156 B1 * | 10/2001 | Lui ........................... 60/39.07 |

* cited by examiner

*Primary Examiner*—William C. Doerrler
*Assistant Examiner*—Malik N. Drake
(74) *Attorney, Agent, or Firm*—William J. Zak, Jr. Esq.

(57) ABSTRACT

An integrated environmental control system for providing conditioned air supply in an aircraft is provided. The system includes an integrated bootstrap air cycle subsystem and a regenerative air cycle subsystem, which are in heat exchange relationship. The bootstrap and the regenerative air cycle systems are also in heat exchange relationship with a liquid cooling cycle subsystem. In the bootstrap cycle, bleed air is compressed and expanded. After absorbing heat from the liquid cycle, the expanded air from the bootstrap cycle is received and expanded by a first turbine of the regenerative air cycle. Before it is received by a compressor of the regenerative cycle, the air flow, which is expanded and cooled by the first turbine, absorbs heat from the liquid cycle, supplies air to the cabin and absorbs heat from the bootstrap cycle. After the compression, the air flow is received by a second turbine of the regenerative cycle and expanded. The expanded air flow merges into the air flow from the first turbine of the regenerative cycle.

21 Claims, 3 Drawing Sheets

RECIRCULATING REGENERATIVE AIR CYCLE

BACKGROUND OF THE INVENTION

The present invention generally relates to air cycle environmental control systems and, more particularly, to 2 spool air cycle systems.

Environmental control systems (ECSS) are used to provide a supply of conditioned air to an enclosure, such as an aircraft cabin, cockpit and avionics equipment cooling (air and liquid). In the past, an air cycle ECS has typically operated on a flow of bleed air taken from an intermediate or high-pressure stage within a jet engine having multi-compression stages. The bleed air has usually been pre-cooled within a primary heat exchanger with heat being dumped to RAM air and then flowed to a compressor. After compression, the air has been routed through a series of heat exchangers and condensers. Then, the air has typically been expanded by a turbine, which is mechanically engaged to the compressor. Finally, the air is conditioned to supply temperature and ready to delivery for compartment and equipment cooling.

Past air cycle ECS designs have included 2, 3 and 4 wheel bootstrap designs. The general distinction among the three designs relates to the number of so-called wheels, which are mechanically engaged to one another. All three of the bootstrap designs typically utilize a reheater and a condenser heat exchanger to respectively pre-cool the bleed air and then condense the water vapor in it. After condensation, the condensed water is removed by a water extractor. The resulting dehumidified air flows to the reheater where the remaining water droplets are evaporated, leaving the residual moisture in the vapor phase. The dry air then flows to a turbine for expansion and consequent cooling. The expansion will typically cool the air to below freezing temperature and thus the vapor particles form ice nuclei and crystallize into snow, which are swept downstream.

In the conventional 2-wheel bootstrap air cycle system, the subfreezing expanded air from the turbine can be used to absorb waste heat from the liquid cooling system then is supplied to cool the air load and the cabin. In order to maintain the air load and cabin air supply temperatures to the design requirement (normally 35° F.) as well as satisfying the liquid supply temperature, additional air flow, beyond the flow schedule for the cabin and air cooled load, is required. However, the additional air flow, can generally be used for regenerative cooling to enhance system performance, the regenerative flow is discharged to ambient. This extra flow demand from the bleed source (i.e., an aircraft engine) imposes a penalty to the aircraft's overall performance.

Considering the shortcomings of the presently available 2-wheel bootstrap air cycle systems, there is a need for an advanced air cycle system which increases overall performance of an aircraft by consuming less bleed air and providing an efficient heat sink condition.

SUMMARY OF THE INVENTION

In one aspect of the present invention, an integrated environmental control system for providing conditioned air supply in an aircraft comprises a first compressor and a first turbine of a first air cycle system as well as a second turbine and a second compressor of a second air cycle system.

The first compressor receives a first air flow from an engine of the aircraft and transforms the first air flow into a first compressed air flow. The first turbine is mechanically connected to the first compressor. The first turbine transforms the first compressed air flow into a first expanded air flow while simultaneously cooling the first compressed air flow and converting the energy of the first compressed air flow into a first work output to rotationally drive the first compressor.

The second turbine of the second air cycle system receives the first expanded air flow and transforms it into a second expanded air flow while simultaneously cooling the first expanded air flow and converting the energy of it into a second work output. The second compressor is in fluid communication with the second turbine and driven by the second work output. The second compressor receives the second expanded air flow from the second turbine through an air flow path. The second expanded air flow in the air flow path absorbs thermal energy from the first air cycle system.

In another aspect of the present invention, a process for supplying conditioned air in an aircraft comprises the steps of receiving a bleed air flow from an engine of the aircraft, transforming the bleed air flow into a first compressed air flow in a compressor of a bootstrap air cycle system, transforming the first compressed air flow into a first expanded air flow in a turbine of the bootstrap air cycle system, transforming the first expanded air flow into a second expanded air flow by a turbine of a regenerative air cycle system and receiving the second expanded air flow through a second compressor of the regenerative air cycle system.

The first compressed air flow is transformed into a first expanded air flow by utilizing a first turbine of the bootstrap air cycle system while simultaneously cooling the first compressed air flow and converting the energy of the first compressed air flow into a first work output to rotationally drive the first compressor. The first expanded air flow is transformed into a second expanded air flow by utilizing a second turbine of the regenerative air cycle system while simultaneously cooling the first expanded air flow and converting the energy of the first expanded air flow into a second work out put. The second expanded air flow is received through a second compressor of the regenerative air cycle system. The second compressor is in fluid communication with the second turbine and rotationally driven by the second work output. The second compressor receives the second expanded air flow from the second turbine through an air flow path. The second expanded air flow in the air flow path absorbs thermal energy from the bootstrap air cycle system through a regenerative heat exchanger.

These and other features, aspects and advantages of the present invention will become better understood with reference to the following drawings, description and claims.

DETAILED DESCRIPTION OF THE INVENTION

The present invention employs a 2-spool integrated air cycle system comprising a bootsrap air cycle machine (ACM) with a compressor and a turbine and a recirculation air cycle machine (ACM) with a compressor and one or two turbines. The 2 spool integrated air cycle system can also be configured as two integrated concentric shafts. Each of two shafts operates at different speeds thus maximizing the turbomachinery efficiency. As will be described more fully below, the recirculation air cycle machine forms a partially closed loop air circuit to absorb the heat from the liquid cooling system and reject it to the ram air. Further, as opposed to the conventional approach where the regenerative flow discharges to ambient, the present invention incorporates a recirculation compressor to form a closed loop circuit to recycle the regenerative flow. This reduces the bleed air consumption and minimizes the overall aircraft penalty. Further, the system of the present invention uses excess bleed air pressure to operate the recirculation compressor. However, in the conventional systems, the excess bleed air pressure is normally throttled and wasted in a flow control device.

Figure 1:
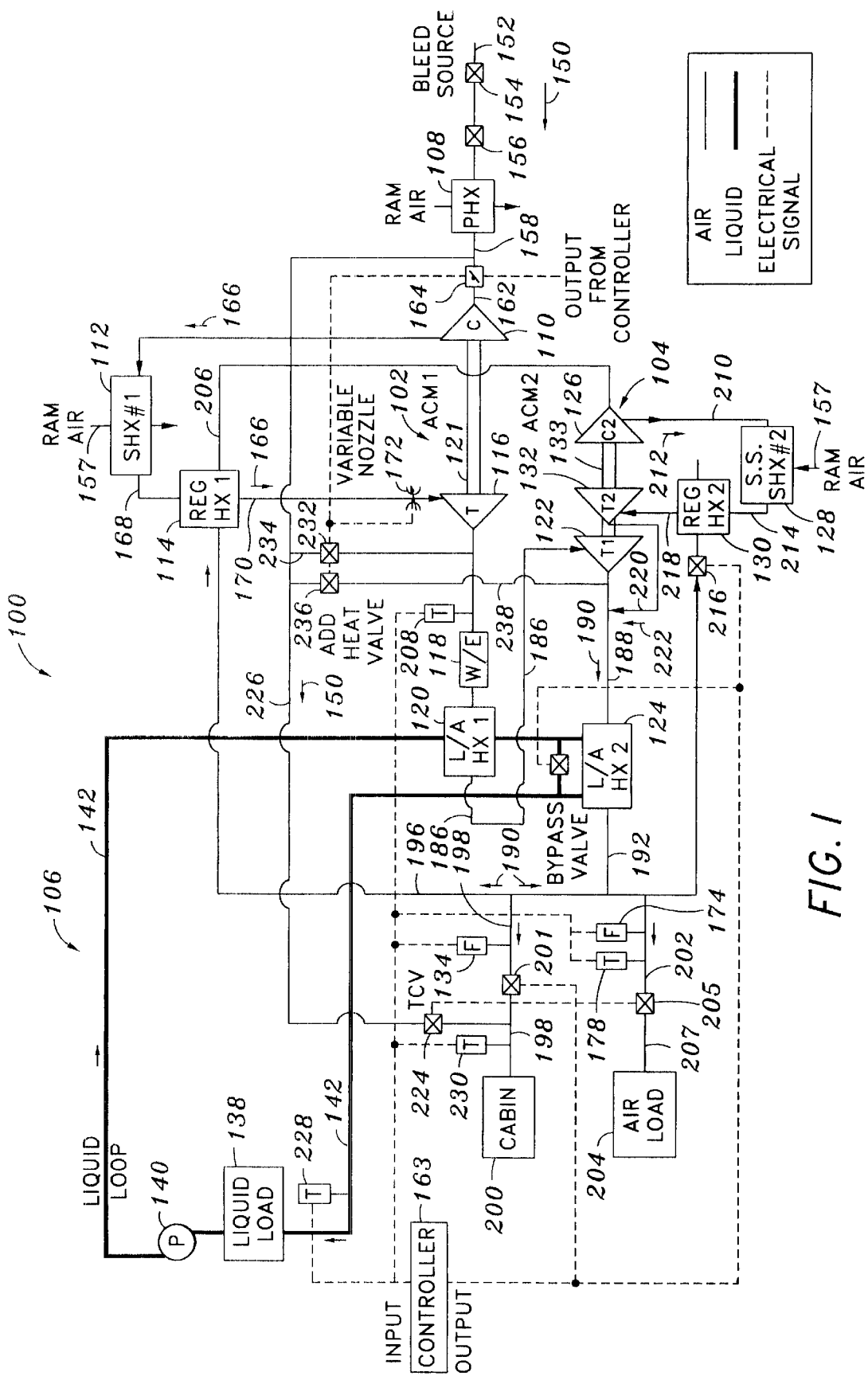
FIG. 1 is a schematic diagram of an environmental control system of the present invention.

Reference will now be made to the drawings wherein like numerals refer to like parts throughout. FIG. 1 illustrates an integrated environmental control system (ECS) 100 of the present invention comprising a first air cycle subsystem 102, a second air cycle subsystem 104, and a liquid cycle subsystem 106. The first air cycle subsytem 102 is in air flow communication with and in heat exchange relationship with the second air cycle subsystem 104. The liquid cycle subsystem 106, often referred to as liquid loop, is in heat exchange relationship with both subsystems 102 and 104. The liquid cycle subsystem 106 is used for the purpose of cooling a liquid load, such avionics equipment like radar. In this embodiment, the first air cycle machine 102 comprises a bootstrap spool air cycle machine (bootstrap ACM) while the second air cycle machine 104 comprises a recirculation air cycle machine (recirculation ACM).

The bootstrap ACM 102 primarily conditions bleed air for the cabin by lowering its temperature, pressure, and humidity before entering the cabin. Bleed air is typically supplied by a compressor driven by the aircraft's engine (not shown). The recirculation ACM 104 also conditions the bleed air; however, as will be described below, its primary function is to form a closed loop circuit to recycle regenerative air flow which is discharged to ambient in the prior art. In this context, ambient is defined as the surrounding air of the environmental control system 100.

In accordance with the principles of the present invention, the bootstrap ACM 102 comprises a first heat exchanger 108 or primary air-to-air heat exchanger, a compressor 110, a second heat exchanger 112 or a secondary air-to-air heat exchanger, a first regenerative heat exchanger 114, a turbine 116, a water extractor 118, and a first liquid-to-air heat exchanger 120. In the bootstrap ACM 102, the compressor 110 and the turbine 116 are mounted on a shaft 121. The recirculation ACM 104 comprises a first turbine 122, a second liquid-to-air heat exchanger 124, the first regenerative heat exchanger 114, a compressor 126, a second heat exchanger 128 or a secondary air-to-air heat exchanger, a second regenerative heat exchanger 130, a second turbine 132. In the recirculation ACM 104, the compressor 126, the second turbine 132, and the first turbine 122 are mounted on a shaft 133. Between the bootstrap ACM 102 and the recirculation ACM 104, a heat exchange relationship may be established through the first regenerative heat exchanger 114 that is a shared component.

Through the first regenerative heat exchanger 114 the regenerative air flow, which is circulated by the recirculation ACM 104, absorbs thermal energy from the air flow circulating within the bootstrap ACM 102. In this respect, the liquid cycle subsystem 106 may also have components that function as a part of the bootstrap ACM 102 and the recirculation ACM 104. The liquid cycle subsystem 106 comprises the first liquid-to-air heat exchanger 120 and the second liquid-to-air heat exchanger 124. The subsystem 106 also comprises a liquid load 138 and a pump 140 to circulate liquid coolant. A circulation conduit 142 connects the aforementioned components of the liquid loop 106. In this respect, through the liquid-to-air heat exchangers 120 and 124, each of the bootstrap ACM 102 and the recirculation ACM 104 separately establish a heat exchange relationship with the liquid cycle subsystem 106, thereby absorbing thermal energy from the liquid cycle subsystem 106.

As will be more fully described hereinbelow, in the preferred embodiment, once a flow of bleed air enters the bootstrap ACM 102 via the first heat exchanger 108, the bleed air is first compressed by the compressor 110 and then cooled through the second heat exchanger 112 and the first regenerative heat exchanger 114 before arriving at the turbine 116. At the turbine 116, the compressed air is expanded and cooled and the condensed water is removed from the turbine outflow air at the water extractor 118. The air flow then absorbs the system heat from liquid coolant at the first liquid-to-air heat exchanger 120 and is then re-expanded by the first turbine 122 of the recirculation ACM 104. The air flow from the first turbine 122 is used to absorb the system heat from the liquid coolant at the second liquid-to-air heat exchanger 124 and is then directed to the first regenerative heat exchanger 114 to absorb more heat from the compressed bleed air coming from the secondary heat exchanger 112 of the bootstrap ACM 102. The compressor of the recirculation ACM 104 receives this air flow and sends it to the second turbine 132 through the secondary air-to-air heat exchanger 128 and the second regenerative heat exchanger 130. The air flow is once again expanded in the second turbine 132 and merges with the first turbine flow of the recirculation ACM 104.

Referring to FIG. 1, the bleed air flow 150, which may be a water vapor bearing air flow, enters the bootstrap ACM 102 through a duct 152. The bleed air flow 150 flows through a series of valves 154, 156 and the primary heat exchanger 108. At the primary heat exchanger, the bleed air flow 150 is pre-cooled by means of RAM air 157 (or ambient air), discharged into a duct 158 which leads to a flow control valve 164, passes through a duct 162, and into the compressor 110 of the bootstrap ACM 102. The flow control valve 162 is controlled by a system controller 163 to satisfy the bleed air flow demand of the environmental control system 100 of the present invention. The operation of flow control valve 162 also synchronizes with the variable geometry nozzle 172, which is an integral part of turbine 116. The details of the operation and control will be discussed below. In the compressor 110, the bleed air 150, which is pre-cooled in the heat exchanger 108 and throttled through the flow control valve 162, is compressed therein and discharged into a duct as a compressed air flow 166. For clarification purposes, the compressed air flow 166 will be referred to as the "first compressed air flow" hereinafter.

From the compressor 110, the first compressed air flow 166 leads to the secondary heat exchanger 112, through a duct 168, and into the first regenerative heat exchanger 114. At the secondary heat exchanger 112, the heat of compression is rejected to the RAM air 157 while in the first regenerative heat exchanger 114 the heat is advantageously absorbed by the recirculation ACM 104, which will be described below.

From the regenerative heat exchanger 114, the first compressed air 166 flows through a duct 170 which leads to a variable geometry nozzle 172 and then expands in the turbine 116 of the bootstrap ACM 104. The variable geometry nozzle 172 is an integral part of turbine 116 and is designed with a sliding vane nozzle such that the area of the nozzle can be modulated with an industrial actuator which is also part of the turbine 116. The variable geometry nozzle operates in a relationship with the flow control valve 164 to modulate the power to operate the recirculation ACM 104. When the system demands additional pressure to increase the flow rate through heat exchanger 114, the variable geometry nozzle 172 will decrease its flow area and to maintain the same flow supply the flow control valve 164 will have to increase the valve area and allow high pressure to pass through to the system. This feature is distinct from the prior art and takes advantage of the normally wasted pressure in the flow control valve 164 to operate the recirculation ACM 104. The result is a reduction in bleed air demand to satisfy the cooling demand. The flow 166 is pre-cooled at the second heat exchanger 112 and at the first regenerative heat exchanger 114, and is provided with the duct 170 in fluid communication with the turbine 116.

In the turbine 116, the first compressed air flow 166 is cooled and expanded and then flowed into a duct 180 as an expanded air flow 182. The expanded air flow 182 from the turbine 116 will be referred to as the "first expanded air flow" hereinafter. In this respect, the expansion process performed by the turbine 116 involves an energy conversion process which transforms the energy of the compressed air flow 166 into mechanical energy while expanding it. Accordingly, a power output resulting from this energy conversion rotates the turbine 116 and hence, via shaft 121, drives the compressor 110. As the first expanded air flow 182 flows toward the water extractor 118, water vapor in the first expanded air flow 182 condenses. The condensed water is removed at the water extractor 118.

From the water extractor 118, the first expanded air flow flows through a duct 184 which leads to the first liquid-to-air heat exchanger 120. As it flows through the first liquid-to-air heat exchanger 120, the expanded air flow 182 absorbs heat from the liquid cycle subsystem 106 and thereby becomes warmer. Then, in this embodiment, the first expanded air flow 182 flows through a duct 186 which leads to the first turbine 122 of the recirculation ACM 104. At this point, the present invention differs from the prior art systems by recovering the thermal energy from the liquid cooling cycle subsystem 106 and using it as a useful work to power the first turbine 122 of the regenerative ACM 104. As also mentioned above, the operating relationship between the variable geometry nozzle 172 and the flow control valve 164 allows the system to utilize the throttled pressure wasted in the flow control valve of the prior art to power the recirculation ACM 104 to reduce bleed air consumption. As previously mentioned, such prior art systems use excessive amounts of bleed air resulting in overall aircraft penalties.

The first expanded air flow 182, which is warmed at the heat exchanger 120, is now further expanded and cooled down to subfreezing temperatures by the first turbine 122 and discharged into a duct 188 as a second expanded air flow 190. The expansion process performed by the second turbine 132 also involves an energy conversion process which transforms the energy of the first expanded air into mechanical energy while expanding it. As will be described more fully below, a second power output resulting from this energy conversion powers the first compressor 126 and hence the second turbine 132 of the regenerative ACM 104.

The first compressor 126, the second turbine 132 and the first turbine 122 are mechanically connected. Through the duct 188, the second expanded air flow 190 enters the second liquid-to-air heat exchanger 124. As it flows through the heat exchanger 124, the second expanded air flow 190 absorbs heat from the liquid cycle subsystem 106 and thereby functions as a heat sink for the liquid cycle subsystem 106.

From the second liquid-to-air heat exchanger 124, the second expanded air flow, which is warmed at the heat exchanger 124, flows into a duct 192 which branches into two branch air ducts 194 and 196. The second expanded air flow 190 flowing through the duct 194 is directed into both a cabin supply duct 198 which leads to the cabin 200 via a check valve 201 and also an air load supply duct 202 which leads to an air load 204 via a control valve 205. The branch air duct 196, however, leads to the first regenerative heat exchanger 114. As previously mentioned, at the first regenerative heat exchanger 114, the bootstrap ACM 102 and the recirculation ACM 104 is in heat exchange relationship. In this respect, the second expanded air flow 190 originating from the first turbine 122 absorbs heat from both the liquid flow in the liquid cycle subsystem and then the compressed air flow 166 passing through the regenerative heat exchanger 114. From the first regenerative heat exchanger 114, the second expanded air flow 190 flows into the compressor 126 of the recirculation ACM 104 via duct 206.

In the compressor 126, the expanded air 190 which is warmed in the heat exchangers 124 and 114 is compressed therein and discharged into a duct 210 as a second compressed air flow 212. From the compressor 126, the second compressed air flow 212 leads to the secondary heat exchanger 128, through a duct 214, and into the second regenerative heat exchanger 130 of the recirculation ACM 104. At the secondary heat exchanger 128, the heat of compression is rejected to the RAM air 157 while in the regenerative heat exchanger 130 the second compressed air flow 212 is further cooled, if necessary. The heat sink for the regenerative heat exchanger 130 is modulated by the second expanded air flow 190 through the control valve 216. Depending on the design and operating requirement, regenerative heat exchanger 130 and the control valve 216 may not be needed and will further reduce the system weight. Then, the compressed air flow 212, which is pre-cooled, flows into a duct 218 which leads to the second turbine 132 of the recirculation ACM 104.

In the second turbine 132, the second compressed air flow 212 is expanded and then flowed into a duct 220 as a third expanded air flow 222. The third expanded air flow 222 merges with the second expanded air flow 190 at the downstream of the first turbine 122. At this point it is understood that the power for the recompression at the compressor 126 is developed from the air expansions performed in the first turbine 122 and the second turbine 132. Depending on design requirements, the first and the second turbines 122 and 132 of the recirculation ACM 104 may be designed into one turbine wheel.

As previously mentioned, the enabling technique to recover the throttled pressure at the flow control valve 164 is the synchronized operation of the flow control valve 164 and the variation of the nozzle area of the turbine 116. The system controller 163 commands the flow control valve 164 position in conjunction with the position of the nozzle area of the turbine 116 to satisfy the system flow demand. An example can further explain this feature.

To correct the system operating above the turbine 116 discharge set point temperature, the system is required to change the operating condition to lower the inlet temperature of the turbine 116. The approach of the present invention is to increase the flow rate through the heat exchanger 114 and, in doing so, to increase the heat transfer capability of the heat exchanger 114. This results in a lower discharge temperature of the flow 166 to the turbine 116.

Increasing the flow 166 through the heat exchanger 114 requires high power to operate the air cycle machine 104 and the extra power is transferred from the throttled pressure from flow control valve 164. To accomplish this, the temperature sensor 208 will send a signal to the controller 163 to command the nozzle actuator in the turbine 116 to reduce the nozzle area. To maintain the same flow with a smaller nozzle area forces the flow control valve 164 to open the valve area to allow higher pressure to pass through. With higher available pressure to expand in the first turbine 122, the compressor 126 (mechanically coupled to the first turbine 122) will receive additional power to increase the rotational speed and increase the recirculation rates.

The foregoing operation synchronizes the flow control valve 164 and variable geometry nozzle 172. In general, when the area of the nozzle 172 reduces, the area of the valve 164 increases, and vice versa. The temperature supply of the liquid to the liquid load is monitored by the temperature sensor 228. A signal is sent to the controller to modulate the temperature control valve 136. When the temperature control valve 136 is fully opened and the liquid supply temperature is still above design point, the control valve 216 will open to allow cooling flow 190 to flow to heat exchanger 130 to lower the flow temperature to turbine 132. In an extremely cold condition, when variable nozzle 172 is unable to control the turbine 116 discharge temperature, valve 232 is opened to add hot air to raise the temperature to the set point. To maintain an ice-free operation, the valve 236 will add hot air to minimize the ice accumulation on the surface of heat exchanger 124, if required. To control the supply temperature to the air load, the temperature sensor 178 sends a signal to the controller 163 to modulate valve 236. The cabin and air load flows are controlled by control valves 201 and 205, respectively, using the flow sensors 134 and 174. The cabin temperature is controlled by modulating valve 224 using the signal from temperature sensor 230.

EXAMPLES

Figure 2:
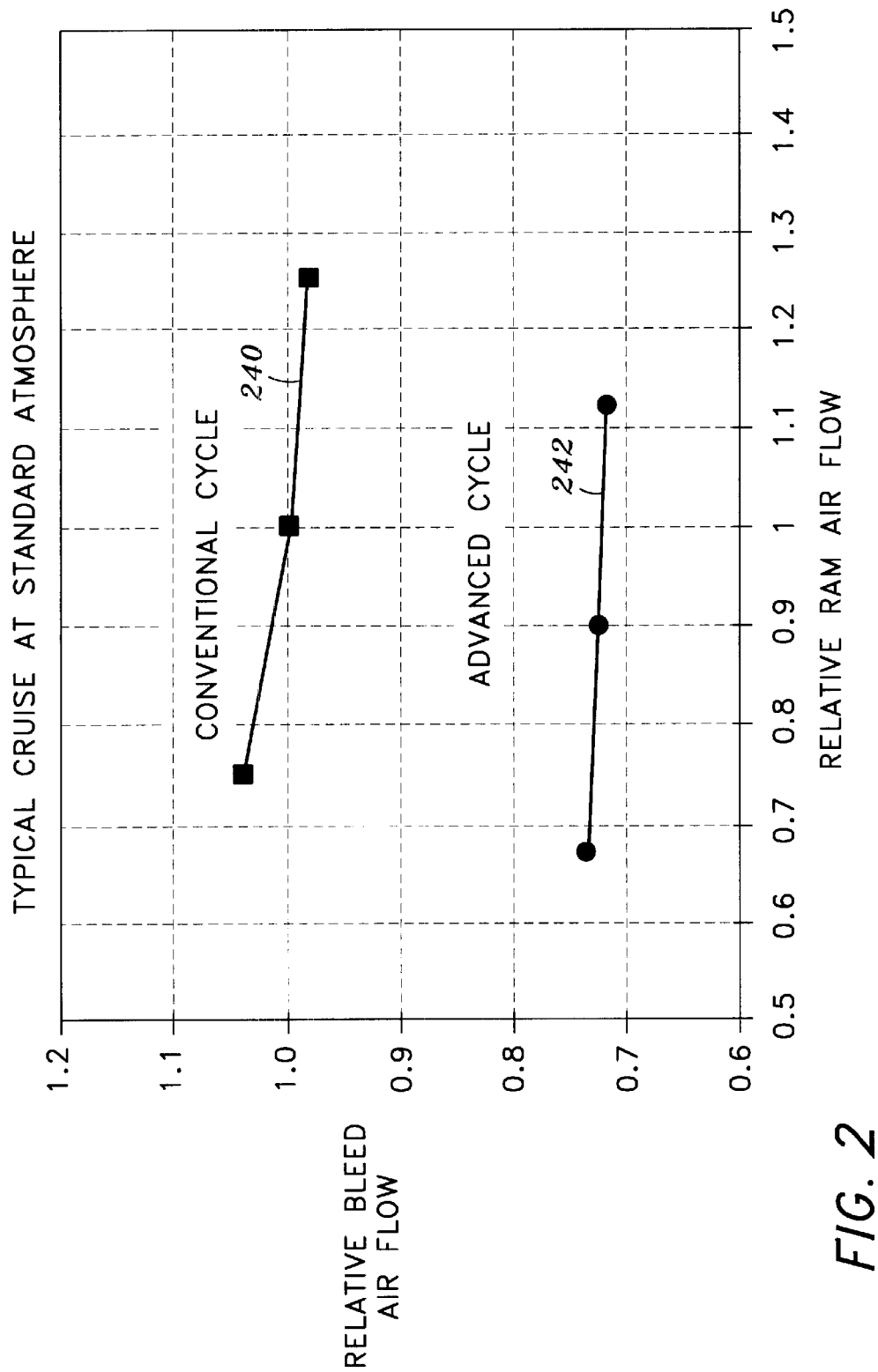
FIG. 2 is a graph comparing the bleed air demand of a conventional system to the bleed air demand of the present invention at various available heat sink flows.
Figure 3:
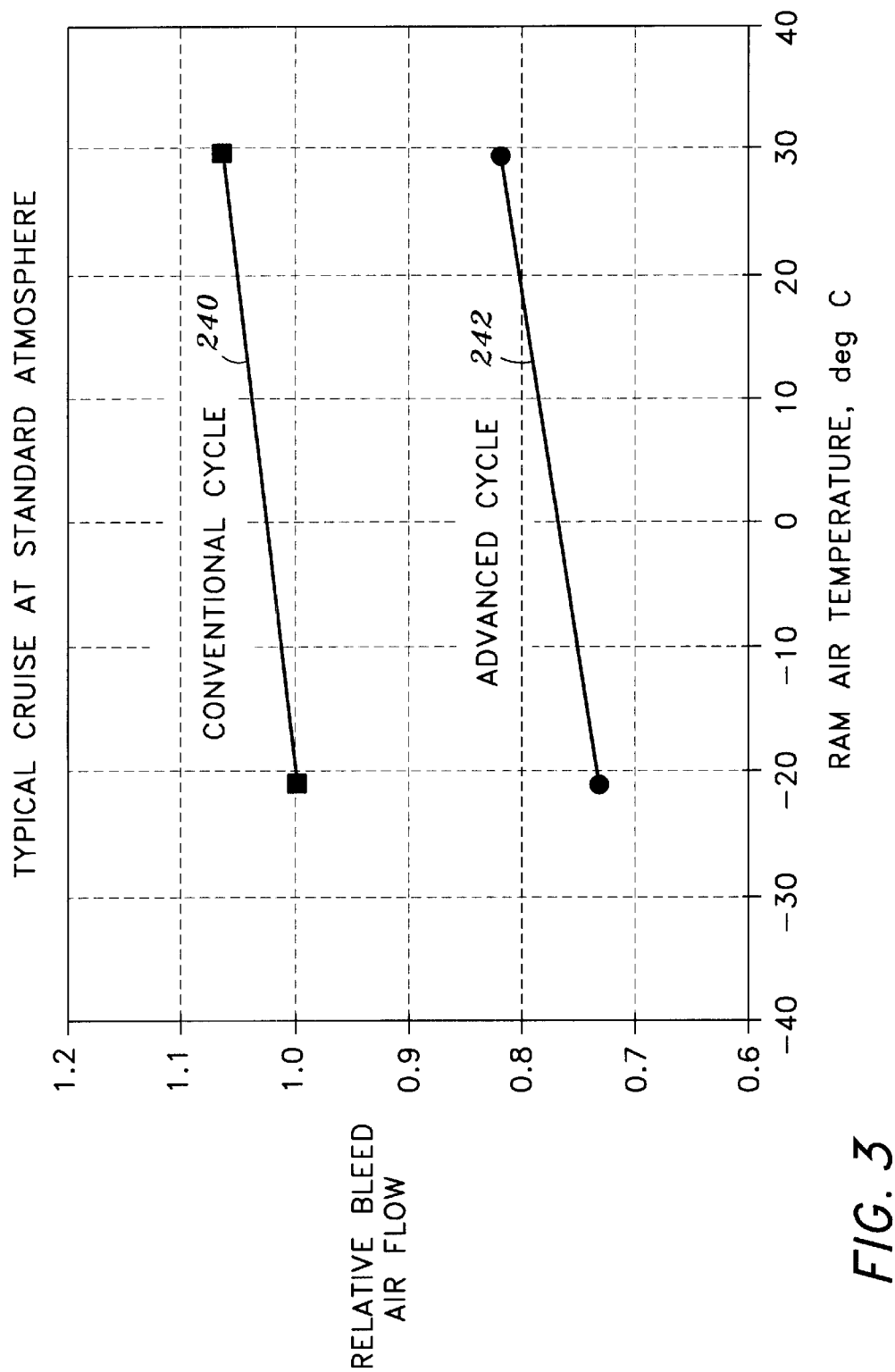
FIG. 3 is a graph comparing the bleed air demand of a conventional system to the bleed air demand of the present invention at various available heat sink temperatures.

The environmental control system 100 of the present invention is able to maintain performance at various sink conditions. FIGS. 2 and 3 compare the bleed air demand of a conventional system (or conventional cycle) 240 and the present invention (or advanced cycle) 242 at various available heat sink flows (total ram air flow) and heat sink temperatures (ram air temperatures). The comparisons are based on the results from a study of the conventional system and the present invention. As shown in FIG. 2, when the sink flows decrease, the present invention utilizes available system pressure to increase recirculation flow rates thus to compensate for the deficiency of the heat sink.

Similarly, in FIG. 3, as the heat sink temperature increases, the present invention utilizes available system pressure to increase the recirculation flow to compensate for heat sink deficiencies. The result is a system for which the sizing condition is dictated more by the load rather than sink conditions. In addition, the lower bleed air consumption indicated in the Figures will favor the present invention more than the other systems in terms of TOGW (take off gross weight). This is an important feature as the modern fighter plane design favors an alternate heat sink such as engine heat fan air, instead of ram air heat sink to allow a higher degree of stealth design.

It will be appreciated that with the aforementioned potential benefits, the advanced cycle of the system of the present invention offers an alternate solution to achieve high liquid load cooling with minimum bleed air flow usage. It is suitable for design consideration for new and existing military aircraft with integrated air refrigeration cycle and liquid cooling system.

It should be understood, of course, that the foregoing relates to preferred embodiments of the invention and that modifications may be made without departing from the spirit and scope of the invention as set forth in the following claims.

We claim:

1. An integrated environmental control system for providing conditioned air supply in an aircraft, comprising:
    a first compressor of a first air cycle system, the first compressor transforms a first air flow into a first compressed air flow;
    a first turbine of the first air cycle system, the first turbine being mechanically connected to the first compressor, wherein the first turbine transforms the first compressed air flow into a first expanded air flow while simultaneously cooling the first compressed air flow and converting the energy of the first compressed air flow into a first work output to rotationally drive the first compressor;
    a second turbine of a second air cycle system, the second turbine receives the first expanded air flow produced by the first turbine and transforms the first expanded air flow into a second expanded air flow while simultaneously cooling the first expanded air flow and converting the energy of the first expanded air flow into a second work output; and
    a second compressor of the second air cycle system, the second compressor being in fluid communication with the second turbine and rotationally driven by the second work output, the second compressor receives the second expanded air flow from the second turbine through an air flow path, wherein the second expanded air flow in the air flow path absorbs thermal energy from the first air cycle system.

2. The environmental control system of claim 1, further comprising a liquid cooling system that is in heat exchange relationship with the first and the second air cycle systems, the liquid cooling system comprising a first liquid-to-air heat exchanger and a second liquid-to-air heat exchanger, wherein the first expanded air flow absorbs thermal energy as it flows through the first liquid-to-air heat exchanger, the thermal energy adapted to power the second turbine.

3. The environmental control system of claim 2, wherein the second liquid-to-air heat exchanger allows the second expanded air flow from the second turbine to absorb thermal energy from the liquid cooling system prior to absorbing thermal energy from the first air cycle system.

4. The environmental control system of claim 3, further comprising an air-to-air regenerative heat exchanger to allow the second expanded air flow from the second turbine of the second air cycle system to be reused to absorb thermal energy from the first air cycle system.

5. The environmental control system of claim 4, further comprising a third turbine of the second air cycle system, wherein the third turbine is mechanically connected to the second turbine and the second compressor and receives a second compressed air flow from the second compressor wherein the second compressed air flow is transformed into a third expanded air flow which is added into the second expanded air flow via the second turbine.

6. The environmental control system of claim 1, further comprising a flow control valve to provide the first air flow that the integrated environmental control system demands.

7. The environmental control system of claim 6, further comprising a variable geometry nozzle such that when the area of the nozzle reduces, the area of the flow control valve increases, and when the area of the nozzle increases, the area of the flow control valve reduces.

8. The environmental control system of claim 7, wherein the flow control valve and the variable geometry nozzle are in operational relationship so that when the system demands additional pressure to increase the flow rate of the second compressed air flow, the flow control valve increases the pressure from the first air flow.

9. The environmental control system of claim 1, wherein the first air flow is bleed air flow.

10. The environmental control system of claim 1, wherein the first air cycle system is a bootstrap air cycle system.

11. The environmental control system of claim 1, wherein the second air cycle system is a closed-loop regenerative air cycle system, wherein the second expanded air flow is used to absorb a liquid load and is reused to further cool the first air cycle system.

12. A process for supplying conditioned air, comprising the steps of:

receiving a bleed air flow;

transforming the bleed air flow into a first compressed air flow in a compressor of a bootstrap air cycle system;

transforming the first compressed air flow into a first expanded air flow, by utilizing a first turbine of the bootstrap air cycle system, while simultaneously cooling the first compressed air flow and converting the energy of the first compressed air flow into a first work output to rotationally drive the first compressor;

transforming the first expanded air flow into a second expanded air flow, by utilizing a second turbine of a regenerative air cycle system, while simultaneously cooling the first expanded air flow and converting the energy of the first expanded air flow into a second work out put; and receiving the second expanded air flow by utilizing a second compressor of the regenerative air cycle system, the second compressor being in fluid communication with the second turbine and rotationally driven by the second work output, the second compressor receives the second expanded air flow from the second turbine through an air flow path, wherein the second expanded air flow in the flow path absorbs thermal energy from the first air cycle system through a regenerative heat exchanger.

13. The process of claim 12, further comprising absorbing thermal energy from a liquid cycle system through a liquid-to-air heat exchanger to allow the second expanded air flow from the second turbine to absorb thermal energy from the liquid cooling system prior to absorbing thermal energy from the bootstrap air cycle system.

14. The process of claim 13, further comprising supplying the second expanded air flow leaving the liquid-to-air heat exchanger to an enclosure and an air load.

15. The environmental control system of claim 14, further comprising:

transforming the second expanded air flow into a second compressed air flow through the second compressor;

receiving the second compressed air flow in a third turbine of the regenerative air cycle system; and transforming the second compressed air flow into a third expanded air flow, wherein the third turbine is mechanically connected to the second compressor air flow which is added into the second expanded air flow.

16. The process of claim 15, further comprising adding the third expanded air to the second expanded air at the downstream of the second turbine of the regenerative air cycle system.

17. The process of claim 12, further comprising regulating the bleed air through a flow control valve to provide the bleed air flow that the integrated environmental control system demands.

18. An integrated environmental control system, comprising:

a flow control valve to provide a first air flow;

a first air cycle system comprising:

a first compressor to transform the first air flow into a first compressed air flow; and a first turbine to transform the first compressed air flow into a first expanded air flow while simultaneously cooling the first compressed air flow and converting the energy of the first compressed air flow into a first work output to rotationally drive the first compressor, the first turbine being mechanically connected to the first compressor;

a second air cycle system comprising:

a second turbine to receive the first expanded air flow and transform the first expanded air flow into a second expanded air flow while simultaneously cooling the first expanded air flow and converting the energy of the first expanded air flow into a second work output; and a second compressor to receives the second expanded air flow from the second turbine through an air flow path, wherein the second expanded air flow in the air flow path absorbs thermal energy from the first air cycle system, the second compressor being in fluid communication with the second turbine and rotationally driven by the second work output; and a variable geometry nozzle that is an integral part of the first turbine, wherein the flow control valve and the variable geometry nozzle are in operational relationship so that when the system demands additional pressure to increase the flow rate of the second compressed air flow, the flow control valve increases the pressure from the first air flow.

19. The environmental control system of claim 18, further comprising a liquid cooling system that is in heat exchange relationship with the first and the second air cycle systems, the liquid cooling system comprising:

a first liquid-to-air heat exchanger, wherein the first expanded air flow absorbs thermal energy as it flows through the first liquid-to-air heat exchanger, the thermal energy adapted to power the second turbine; and a second liquid-to-air heat exchanger to allow the second expanded air flow from the second turbine to absorb thermal energy from the liquid cooling system prior to absorbing thermal energy from the first air cycle system.

20. The environmental control system of claim 18, further comprising an air-to-air regenerative heat exchanger to allow the second expanded air flow from the second turbine of the second air cycle system to be reused to absorb thermal energy from the first air cycle system.

21. The environmental control system of claim 18, further comprising a third turbine of the second air cycle system, wherein the third turbine is mechanically connected to the second turbine and the second compressor and receives a second compressed air flow from the second compressor wherein the second compressed air flow is transformed into a third expanded air flow which is added into the second expanded air flow via the second turbine.

* * * * *